(12) United States Patent
Johnson

(10) Patent No.: US 9,044,820 B2
(45) Date of Patent: Jun. 2, 2015

(54) AUGER WITH LASER CLADDING AND/OR LASER HEAT TREATMENT AND METHOD

(71) Applicant: Keith A. Johnson, Kewaskum, WI (US)

(72) Inventor: Keith A. Johnson, Kewaskum, WI (US)

(73) Assignee: Kondex Corporation, Lomira, WI (US)

( * ) Notice: Subject to any disclaimer, the term of this patent is extended or adjusted under 35 U.S.C. 154(b) by 76 days.

(21) Appl. No.: 13/938,410

(22) Filed: Jul. 10, 2013

(65) Prior Publication Data

US 2015/0014127 A1    Jan. 15, 2015

(51) Int. Cl.
  *B65G 33/26* (2006.01)
  *B23K 26/00* (2014.01)
  *B65G 33/08* (2006.01)
  *B23K 26/34* (2014.01)

(52) U.S. Cl.
  CPC ............ *B23K 26/0051* (2013.01); *B65G 33/08* (2013.01); *B23K 26/345* (2013.01)

(58) Field of Classification Search
  CPC ...... B65G 33/265; B65G 33/14; B65G 33/26; B65G 33/24
  USPC ......................................... 198/657, 676, 677
  See application file for complete search history.

(56) References Cited

U.S. PATENT DOCUMENTS

| | | | |
|---|---|---|---|
| 3,937,317 A | | 2/1976 | Fleury, Jr. |
| 3,944,443 A | * | 3/1976 | Jones ............................ 148/220 |
| 4,416,656 A | * | 11/1983 | Shapiro .......................... 494/53 |
| 4,451,302 A | * | 5/1984 | Prescott et al. ............... 148/224 |
| 4,466,533 A | * | 8/1984 | Shwayder ..................... 198/676 |
| 4,516,302 A | * | 5/1985 | Chulada et al. ................. 29/889 |
| 4,666,033 A | | 5/1987 | Reid |
| 4,842,126 A | | 6/1989 | McConnell |
| 4,949,836 A | * | 8/1990 | Schostek ....................... 198/676 |
| 5,092,453 A | * | 3/1992 | Bruke ........................... 198/673 |
| 5,673,618 A | * | 10/1997 | Little ............................ 198/676 |
| 6,089,334 A | | 7/2000 | Watts |
| 6,155,705 A | * | 12/2000 | Douris et al. ................. 198/676 |
| 2002/0131328 A1 | * | 9/2002 | Bowens et al. ............... 366/318 |
| 2009/0095214 A1 | | 4/2009 | Whitfield |

FOREIGN PATENT DOCUMENTS

EP    2 200 914        3/2009
EP    2 371 205 A1    10/2011

* cited by examiner

*Primary Examiner* — James R Bidwell
(74) *Attorney, Agent, or Firm* — Reinhart Boerner Van Deuren P.C.

(57) ABSTRACT

An agricultural auger for conveying grain material is provided. The agricultural auger includes a shaft that is adapted to rotate about a central axis. A flight extends and spirals about the shaft. The flight further includes a base material of a first hardness. A laser treated material is formed on or into the base material along a portion of the flight. The laser treated material comprises a second hardness greater than the first hardness.

40 Claims, 6 Drawing Sheets

AUGER WITH LASER CLADDING AND/OR LASER HEAT TREATMENT AND METHOD

FIELD OF THE INVENTION

This invention generally relates to the field of augers and more specifically to agricultural augers.

BACKGROUND OF THE INVENTION

Augers are well known in the art and have been employed in many industries over the years. Augers have proven particularly useful in the field of agriculture. For example augers are employed in combines, transport tube augers, and grain bins to name just a few of the many agricultural uses for augers. Examples of such agricultural augers are shown for example in U.S. Pat. No. 4,842,126 and European Patent EP 2200914.

Frequently augers are used to move fungible materials like grain from one location to another. Often times the material being moved by the augers is hard and abrasive. The hard material, for example, dried corn, is abrasive and erodes the flight of the auger. Over time, the erosion of the auger flight diminishes the flight's and thereby the auger's performance and efficiency. Such wear may cause the auger or even the equipment employing the auger to be replaced. Further, in some instances such worn auger flights can damage the very material that it intended to move.

The auger's loss of performance can be attributable to at least two types of erosion. The first type of auger erosion is found on the top edge of the flighting. In an auger application such as a transport auger such erosion creates an undesirable gap between the auger flight and the tube in which the auger turns. The increased gap allows the conveyed material to slip past the auger flight, not be moved up the tube and thereby result in decreased efficiency. The reduced efficiency of the auger system can eventually lead to the system becoming inoperable.

A second example of erosion is attributable to that which occurs along the face of the flighting. This type of erosion typically takes place along the outer periphery of the flight face and can eventually lead to large segments of flighting becoming detached from the auger.

Efforts have been made to address such auger flight erosion. For example various hard face coatings including thermal spray, plating and various heat treatments through induction or hardening have been applied to the flighting. Further efforts to address the wear problem have included the use of ultrahigh molecular weight flighting as shown in U.S. Pat. No. 4,666,033 or adding additional material to the flight face near the outer edge of the flighting. Additional material to a conveyor is shown in U.S. Pat. No. 3,937,317.

In Agricultural applications traditional weld face techniques have also been applied to augers. However, such efforts introduce a great amount of heat into the auger flight. Because the cross section of the flighting is thin, the high heat applied in this manner can distort the flighting material and further disadvantageously impart undesired metallurgical properties. Such efforts to address auger flight erosion have proven costly, labor intensive and have not reduced to the desired degree of reduced erosion and increased efficiency.

BRIEF SUMMARY OF THE INVENTION

The present invention is directed toward increasing the life span of such augers. The present invention achieves this by providing one of or both of laser cladding to the edge of the auger flighting and laser heat treating to the outer periphery surface of the auger flighting. These and other advantages of the invention, as well as additional inventive features, will be apparent from the description of the invention provided herein.

In one aspect, a fabricated agricultural auger for conveying grain material is provided. An embodiment of the auger according to this aspect includes a shaft that is adapted to rotate about a central axis. A flight extends and spirals about the shaft. The flight further includes a base material of a first hardness. The flight is separately fabricated from the shaft and is welded or otherwise secured thereto. A laser treated material is formed on or into the base material along a portion of the flight. The laser treated material comprises a second hardness greater than the first hardness.

The laser treated material may comprise laser hardening and/or laser cladding.

The base material can be steel and the laser treated material may comprise a laser hardened layer formed integrally with an outer surface of the base material. The laser hardened layer may be at least 0.5 millimeter in depth thickness along the base material.

An embodiment may provide for the laser hardened layer to be between 0.5 and 5 millimeters in depth thickness along the base material. A cross section thickness of the flight is reduced at treated regions of the laser hardened layer relative to untreated regions of the base material.

An embodiment can have a fabricated agricultural auger that has a predetermined inlet end and a predetermined outlet end. The flight includes an upstream face that faces toward the outlet end and a downstream face that faces toward the inlet end. The rotation of the auger conveys material from the inlet end to the outlet end. The laser hardened layer is along the upstream face only and the downstream face only has an outer untreated surface of the base material.

The embodiment may further include an outer treated region of the laser hardened layer along an outer radial periphery of the flight. The inner untreated region of an outer surface of the base material may be disposed radially between the outer treated region and the shaft.

The outer treated region can be between 5% and 35% of a radial span of the flight. The base material can have a hardness of less than 25 in Rockwell C Scale hardness. The laser treated material may have a hardness between 30 and 55 in Rockwell C Scale hardness.

The laser treated material may comprise laser cladding that includes clad material different than the base material. The clad material can be laid along an outermost circumference of the flight that forms a radial outermost peripheral contact surface.

An embodiment of the fabricated agricultural auger may have a predetermined inlet end and a predetermined outlet end. The flight can include an upstream face that faces toward the outlet end and a downstream face that faces toward the inlet end. Rotation of the auger conveys material from the inlet end to the outlet end. An outer circumference edge of base material may extend between the upstream face and the downstream face and laser clad is formed along the outer circumference edge.

Another embodiment of the fabricated agricultural auger may have a predetermined inlet end and a predetermined outlet end. The flight can include an upstream face that faces toward the outlet end and a downstream face that faces toward the inlet end. Rotation of the auger conveys material from the inlet end to the outlet end. An outer circumference edge of base material extends between the upstream face and the downstream face. The laser clad is formed along the outer circumference edge and the flight faces are free of laser clad.

The clad material may include at least one of the materials comprising: tungsten carbide, chrome carbide, iron carbide, ceramic, and other material having a Vickers scale hardness between HV 1200-3200.

The laser treated material may comprise laser cladding that includes a clad material different than the base material. The base material can be steel and the laser treated material can additionally comprise a laser hardened layer formed integrally with an outer surface of the base material. The clad material may can be joined with the laser hardened layer at an outer radial edge thereof.

Another aspect of the present invention is directed toward a method of hardening a fabricated agricultural auger. The auger includes a shaft adapted to rotate about a central axis. A flight is adapted to extend around and spiral about the shaft. The flight includes a base material of a first hardness. The flight is separately fabricated from the shaft and welded or otherwise secured thereto. The method includes laser treating a portion of the base material to provide a hardened region to the auger with a second hardness greater than the first hardness.

The laser treating can include laser cladding a clad material to a region proximate an outermost circumferential surface of the flight. The laser treating can include laser hardening an outer surface of the base material to provide a laser hardened layer formed integrally with the base material. The laser treating may be conducted after the flight is secured to the shaft.

The laser treating may include laser cladding a clad material to a region proximate an outermost circumferential surface of the flight. It can include laser hardening an outer surface of the base material to provide a laser hardened layer formed integrally with the base material.

Yet other aspects of the present invention include incorporation of the fabricated agricultural auger in various agricultural grain handling devices such as transport tube augers, tube augers, combine harvesters or agricultural grain bins that utilize trough augers, horizontal and overhead tube augers as well as free/tubeless augers to name just a few grain handling devices employing the fabricated agricultural grain auger.

In yet another embodiment the present invention provides for an agricultural grain handling device that comprises an agricultural housing that comprises at least one of a grain bin, an auger tube and an auger trough. An auger is disposed in the housing. The auger comprises a shaft adapted to rotate about a central axis. A flight extends and spirals about the shaft. The flight comprises a base material of a first hardness. A laser treated material is formed on or into the base material along a portion of the flight. The laser treated material comprising a second hardness greater than the first hardness.

The base material may be steel, and the laser treated material comprises a laser hardened layer formed integrally with an outer surface of the base material.

The auger has a predetermined inlet end and a predetermined outlet end, the flight includes an upstream face that faces toward the outlet end and a downstream face that faces toward the inlet end. The rotation of the auger conveys grain (e.g. corn, rice, beans or the like) from the inlet end to the outlet end. The laser hardened layer is along the upstream face only and only the downstream face has an outer untreated surface of the base material.

The auger may comprise an outer treated region of the laser hardened layer along an outer radial periphery of the flight, and an inner untreated region of an outer untreated surface of the base material disposed radially between the outer treated region and the shaft. The laser treated material may comprise laser cladding including a clad material different than the base material. The clad material can be laid along an outermost circumference of the flight so that it forms a radial outermost peripheral contact surface.

The auger may have a predetermined inlet end and a predetermined outlet end. The flight can include an upstream face that faces toward the outlet end and a downstream face that faces toward the inlet end. The rotation of the auger conveys material from the inlet end to the outlet end. An outer circumference edge of base material may extend between the upstream face and the downstream face. The laser clad is formed along the outer circumference edge.

In another aspect the auger may have a predetermined inlet end and a predetermined outlet end. The flight can include an upstream face facing toward the outlet end and a downstream face facing toward the inlet end. The rotation of the auger conveys material from the inlet end to the outlet end. An outer circumference edge of base material extends between the upstream face and the downstream face. The laser clad is formed along the outer circumference edge. The flight faces are free of laser clad.

The clad material can comprise at least one of the materials comprising: tungsten carbide, chrome carbide, iron carbide, ceramic, and other material having a Vickers scale hardness between HV 1200-3200.

The laser treated material may comprise laser cladding that includes a clad material different than the base material. The base material may be steel. The laser treated material may additionally comprise a laser hardened layer formed integrally with an outer surface of the base material. The clad material may be joined with the laser hardened layer at an outer radial edge thereof.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
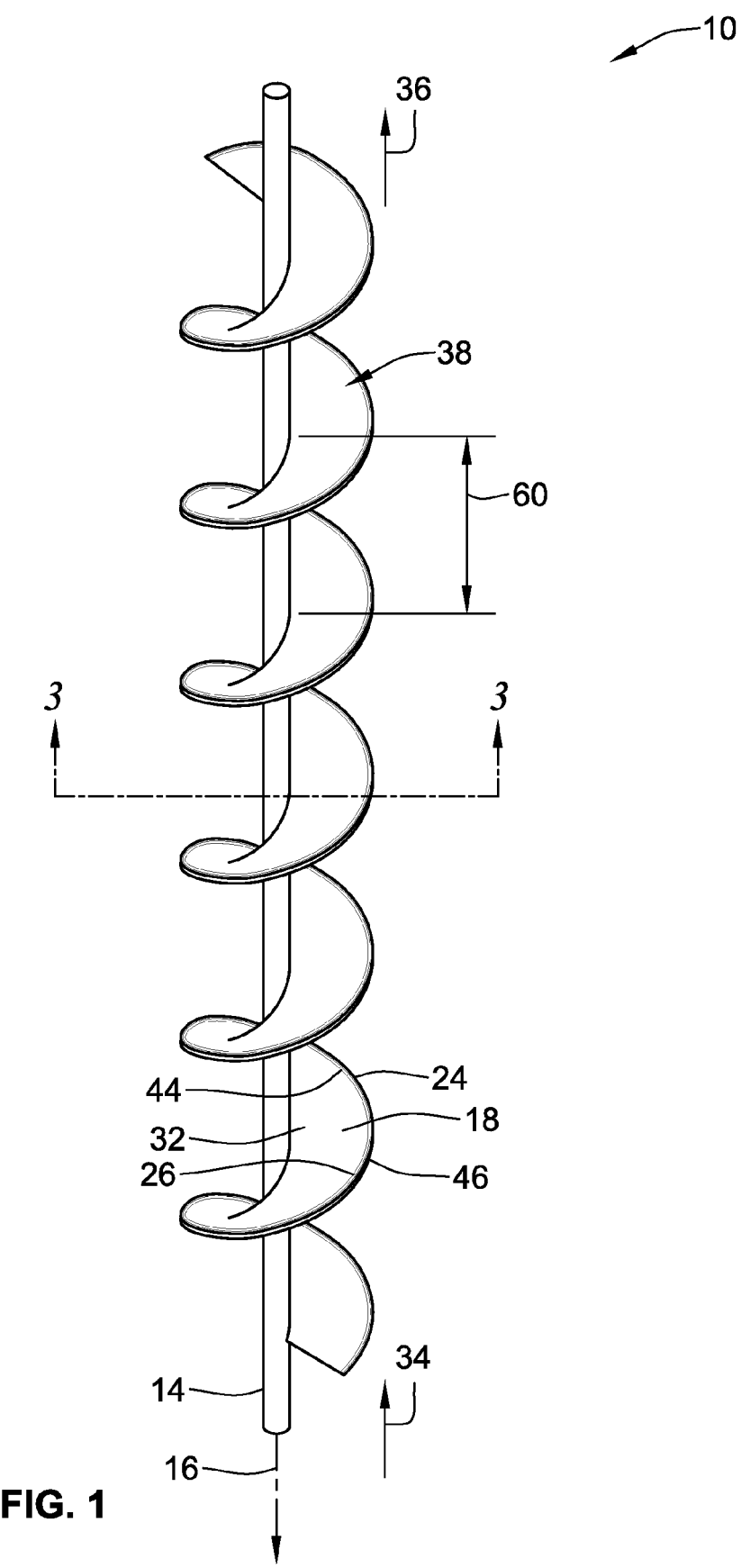
FIG. 1 is an isometric view of a fabricated agricultural auger of an embodiment of the present invention.
Figure 2:
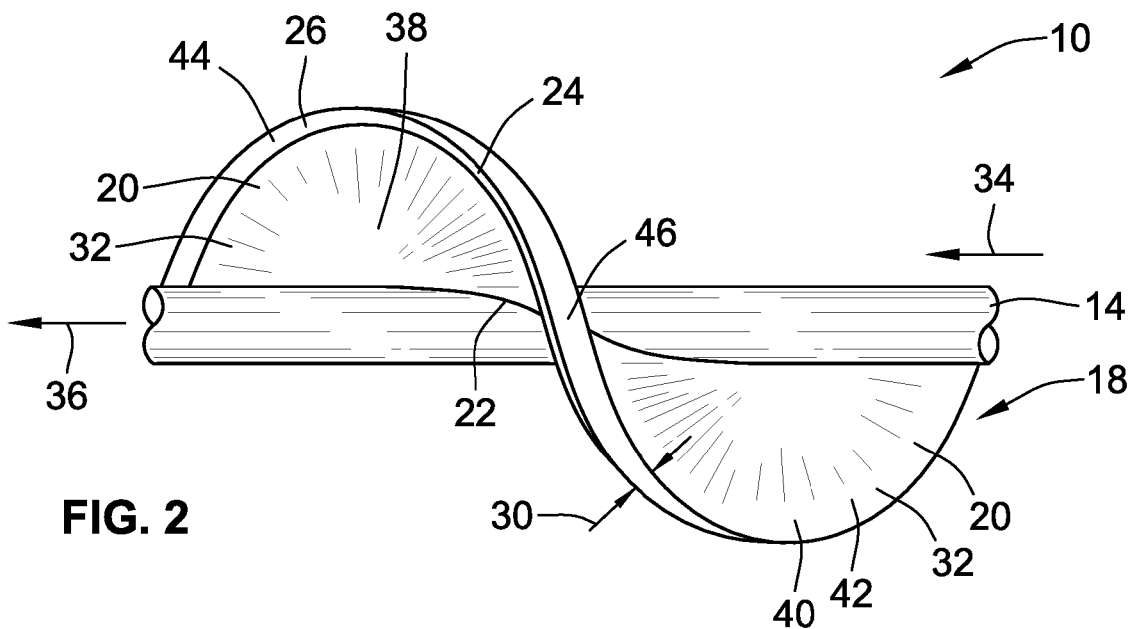
FIG. 2 is an enlarged isometric view of an area of auger flighting showing the laser hardened portion and the laser clad portion.
Figure 3:
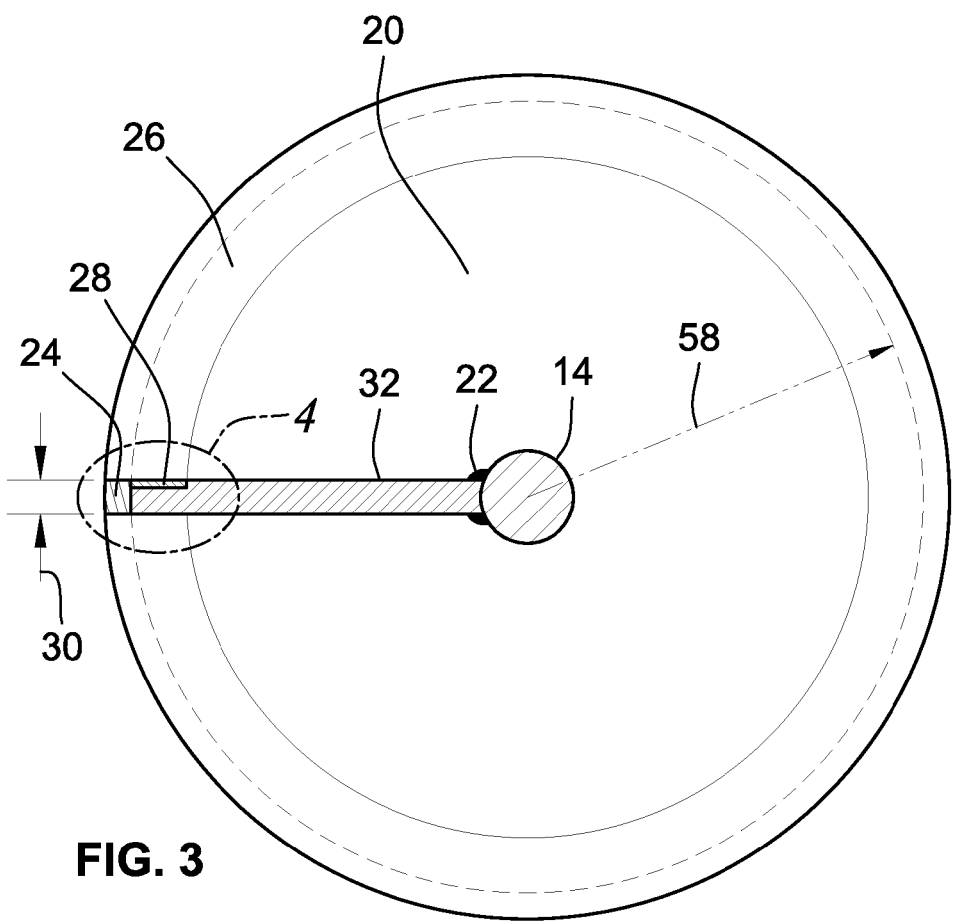
FIG. 3 is a cross section of the auger flighting of FIG. 1.

As shown in FIGS. 1-3, an agricultural auger 10 according to an embodiment of the present invention is illustrated. The agricultural auger comprises a shaft 14 adapted to rotate about a central axis 16. A flight 18 extends spiraling about the shaft 14. The flight 18 comprises a base material 20 of a first hardness. The base material 20 may be steel but can be comprised of any of the materials commonly used in the manufacture of augers. In an embodiment of the present invention that provides for a fabricated agricultural auger, the flight 18 is separately fabricated such as from sheet steel and thereby separated from the shaft 14 that is rod or bar stock. The flight can be spirally configured and welded 22 or otherwise secured to the shaft 14. In a welded embodiment as shown in FIG. 2 welds or other fastening means 22 are placed at that part of the flight in contact with the shaft. The welds 22 are further shown in an exaggerated fashion in FIG. 3. It can be readily appreciated that where the agricultural auger is not fabricated such welds 22 would not be present. The flight pitch 60 may be between 0.25 and 4 per foot. The flight outer diameter may be between 3" and 4" for most agricultural applications.

The agricultural auger has an inlet end 34 and an outlet end 36. Although illustrated is a preferred embodiment that moves grain from the inlet end 34 to the outlet end 36. It is readily apparent that there are many agricultural uses for an agricultural auger 10 such as grain bins, tube augers or combine harvesters to name just a few examples. The material being moved, for example grain, travels along an upstream face 38 of the flight towards the outlet end 36 of the agricultural auger 10. The grain traveling along the upstream face of the flight 38 can cause wear to the base material 20 of the flighting 18 along the outer radial periphery 44 of the flight 18 and to the outer circumferential edge 46 of the flight 18.

The present invention seeks to prevent wear and erosion to the outer radial periphery 44 of the upstream face 38 by applying laser hardening and to the an outermost circumference comprises a circumferential edge 46 of the flight 18 by application of laser cladding.

In the preferred embodiment of the present invention the outer radial periphery 44 of the base material 20 of the flight 18 is laser treated to harden the outer radial periphery 44 of the flight 18. This laser hardened area comprises a material of second hardness 26 on the upstream face 38 of the flight 18.

FIG. 2 shows an enlarged view of the untreated downstream face 40 and the upstream face 38 where laser hardening has been applied to the outer radial periphery 44 of the flight 18 leaving a treated laser hardened upstream layer 28 and an untreated region of flight base material 32. The outer treated region may comprise between 5% and 35% of a radial span 58 of the flight 18 while 100% of the downstream face 40 of the flight makes up a region free of any laser hardening or laser cladding whatsoever.

When laser hardening is applied on the upstream face 38, a region free of any laser hardening or cladding of between 65% and 95% of the upstream face 38 of the flight 18 may exists Though, as discussed more fully below, certain embodiments may have no laser hardening whatsoever on either the upstream 38 or downstream face 40 of the flight 18.

Restricting the laser hardening application to the outer radial periphery of the upstream face of the flight 38 and laser cladding the outer circumferential edge 46 of the base material 20 has a fabrication cost benefit of placing laser hardening and/or laser cladding only where erosion occurs. There are yet further fabrication benefits. For example, traditional welding techniques induce a great deal of heat into the auger flight. Because auger flight materials tend to be relatively thin in cross section, this high heat input can cause distortion of the material and impart undesirable metallurgical conditions in the base material 20 including softening of the flight material which will lead to accelerated wear. Laser cladding and laser hardening are performed with a very shallow heat affected zone. This low heat input process reduces the issues of shape distortion in the flighting where laser hardening and/or cladding are not applied and thus its application does not negatively affect the metallurgical structure of the base material 20.

Figure 4:
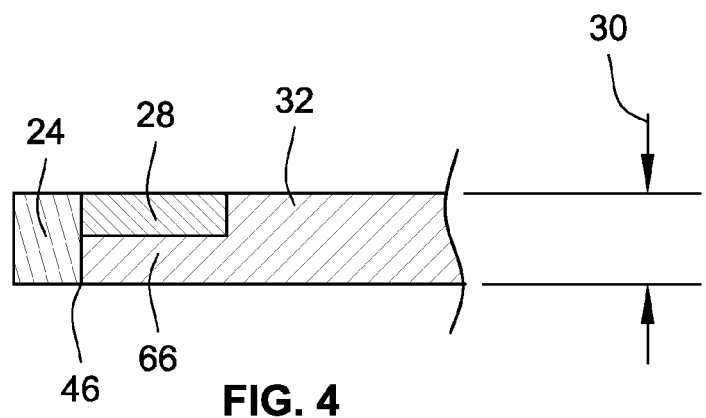
FIG. 4 is an enlarged cross sectional area of the flighting taken about area A of FIG. 3 with the hardened region thickness being exaggerated for illustrative purposes.

Additionally, FIG. 2 shows in this preferred embodiment that laser cladding 24 has been applied to the outer circumferential edge of the flight 18. Thus, FIG. 2 shows both laser hardening 26 and laser cladding 24 applied to the flight 18. However, it can be readily appreciated that depending on a number of variables such as but not limited to the base material 20, the desired wear rate and labor costs it may be that the flight receives only laser cladding on its outer circumferential edge 46 as shown in FIG. 4B. Further, it may be that only that portion of the circumferential edge 46 that abuts the outer radial periphery 44 of the upstream face 38 of the flight 18 and not the entire width of the circumferential edge 46 receives the cladding.

Figure 4A:
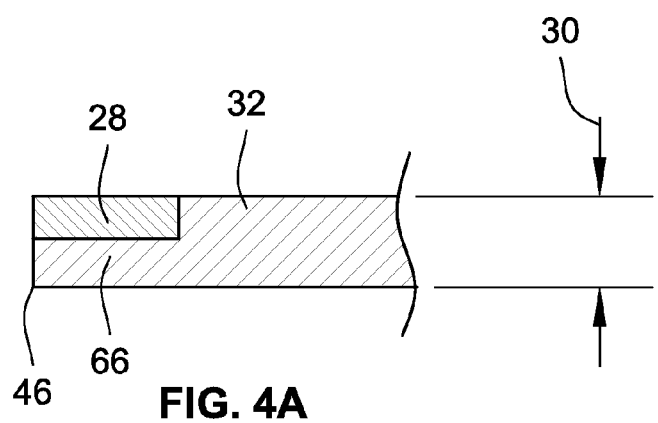
FIG. 4A is an enlarged cross sectional area of flighting of an embodiment where only laser hardening has been applied to the outer radial periphery of the upstream flight face with the hardened region being exaggerated for illustrative purposes. In this embodiment no laser cladding has been applied to the outer circumferential edge.
Figure 4B:
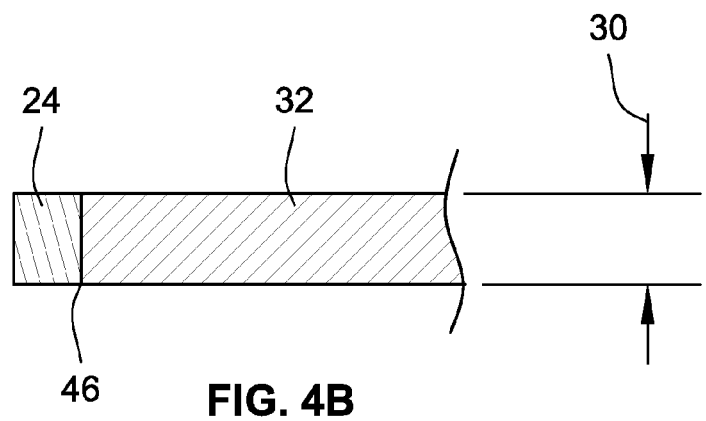
FIG. 4B is an enlarged cross sectional area of flighting of an embodiment where only laser cladding has been applied to the outer circumferential edge. In this embodiment no laser hardening has been applied to the flight.
Figure 4C:
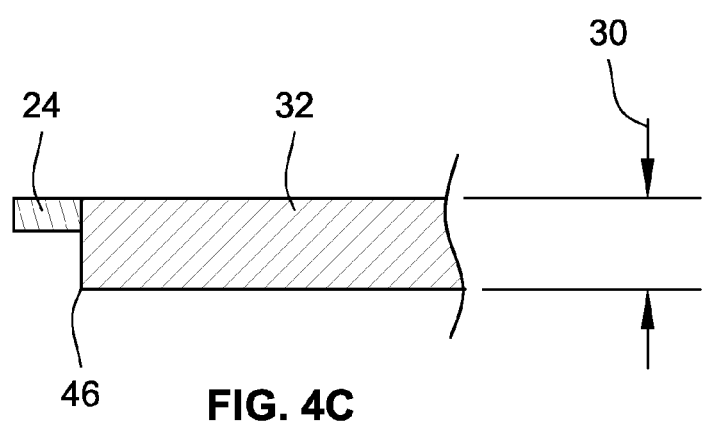
FIG. 4C illustrates an embodiment wherein laser cladding has been applied to only a portion of the width of the outer circumferential edge nearest the outer radial periphery of the upstream flight face.

Still further, it may be that an embodiment has a flight 18 with only laser hardening into its outer radial periphery 44 on its upstream face 38 but does not receive laser cladding on its outer circumferential edge 46 as shown in FIG. 4A. Though not shown here, laser hardening might be applied into the outer circumferential edge 46 of the flight 18. In still other embodiments, not shown here, the laser cladding may be applied to the outer circumferential edge 46 such that it overlaps the edge and resides on the outer radial periphery 44 of the flight 18. The overlap portion may extend from the outer circumferential edge 46 for 1 cm but preferably 1 mm onto the outer radial periphery 44 of the flight 18.

FIG. 3 illustrates an enlarged cross section of the flighting of the preferred embodiment of the agricultural auger 10. The shaft 14 is shown. For most or many agricultural applications the shaft may have a diameter between 0.5 inches and 3 inches and a length between 2 feet and 10 feet with welds 22 that attach the spiraled flighting 18 to the shaft. In long transport augers such as in grain bin applications the overall length can be much greater with multiple shafts splined or connected together. It can be readily appreciated that other known fastening means besides welding may be used. Further, while fabricated augers are common in agricultural applications and thereby an inventive aspect, an embodiment of the present invention includes an agricultural auger that is not fabricated but rather one that maybe be casted, forged or machined. The cross section thickness 30 of the flighting 18 may be between 0.03 inches and 0.75 inches.

FIG. 3 further illustrates the laser hardened region 26 on the outer radial periphery of the flight 18. Where laser heat treating in the form of laser hardening is employed energy is transmitted to the outer radial periphery 44 of the upstream face 38 of the flight 18 in order to create a hardened layer by metallurgical transformation 26, 28. The laser is used as a heat source, and rapidly raises the surface temperature of the material. Heat sinking of the surrounding area provides rapid self-quenching, thus producing a material microstructure that results in a hardened transformation layer 26, 28. This treated hardened layer can extend between 0.5 and 5 millimeters in depth thickness. The laser hardening extends to some degree to an area beyond this expressed depth thickness due to heat transfer to the base material 20 as a result of the laser hardening process.

FIG. 4 shows a cross section of the flight 18 about the radial periphery 44 where laser hardening has been applied and where cladding has been applied to the outer circumferential edge 46. The decreased cross sectional thickness CT of the flight 18, due to the reduction in thickness of the laser hardened region 28 treated region, relative to the cross section 30 of the untreated region 32 of the flight 18 is shown. The base material 20 may have a hardness less than 25 in Rockwell C Scale hardness while laser hardened area 28 is between 0.5 and 5 millimeters in depth thickness. The laser hardened area can have a higher relative hardness between 30 and 55 in Rockwell C Scale hardness.

FIGS. 3 and 4 illustrate the clad layer 24 on the outer circumferential edge 46 of the flight 18. The cladding may be between 0.5 mm and 5 mmin thickness. When cladding is employed, preferably, it comprises tungsten carbide but may also comprise alternatively titanium carbide, chrome carbide, iron carbide, ceramic, and/or high hardness particles in the range of 1200-2500 on the Vickers scale hardness. A finishing process may or may not be employed to the cladding 24 after it is applied to the outer circumferential edge 46 of the flight 18. For example, grinding or other such smoothing operation can be done.

Figure 5:
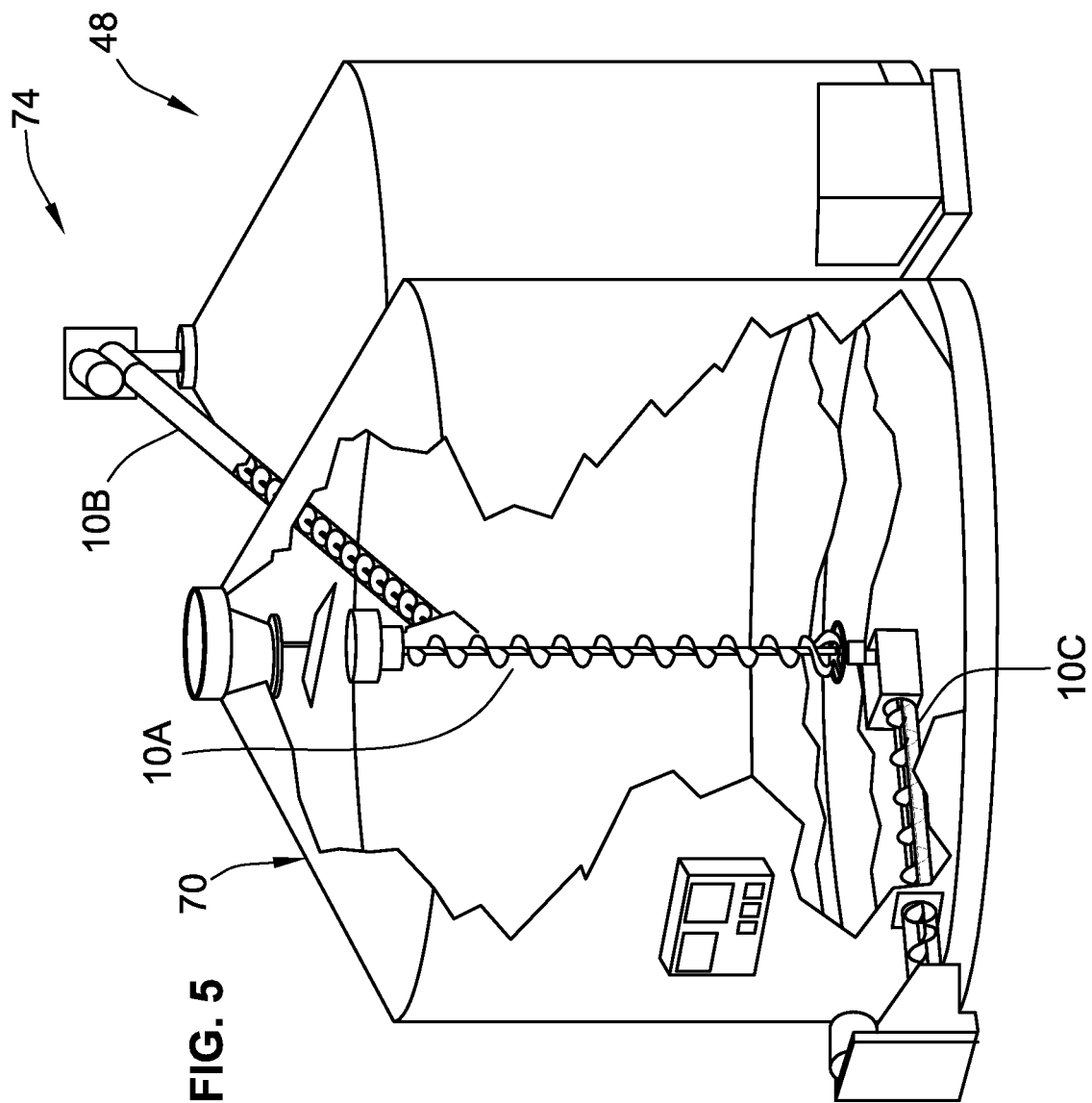
FIG. 5 is a schematic of an agricultural bin employing an embodiment of the present invention.

FIG. 5 illustrates an agricultural grain handling device 74 comprising an agricultural housing 70 comprising an agricultural bin 48 which includes agricultural augers according to embodiments of the present invention in vertical tubeless auger 10A, an overhead tube auger 10B and a trough auger 10C. It is readily apparent that the agricultural augers of the agricultural grain handling devices illustrated in FIGS. 5-8 may be either or both a fabricated agricultural auger or an agricultural auger which has not been fabricated but rather one that has been forged, casted or machined. Such an auger is illustrated in FIGS. 2-3 for example but without the welds or other fastening means 22. Thus, FIG. 1 can be understood to be either a fabricated agricultural auger or an agricultural auger.

Figure 6:
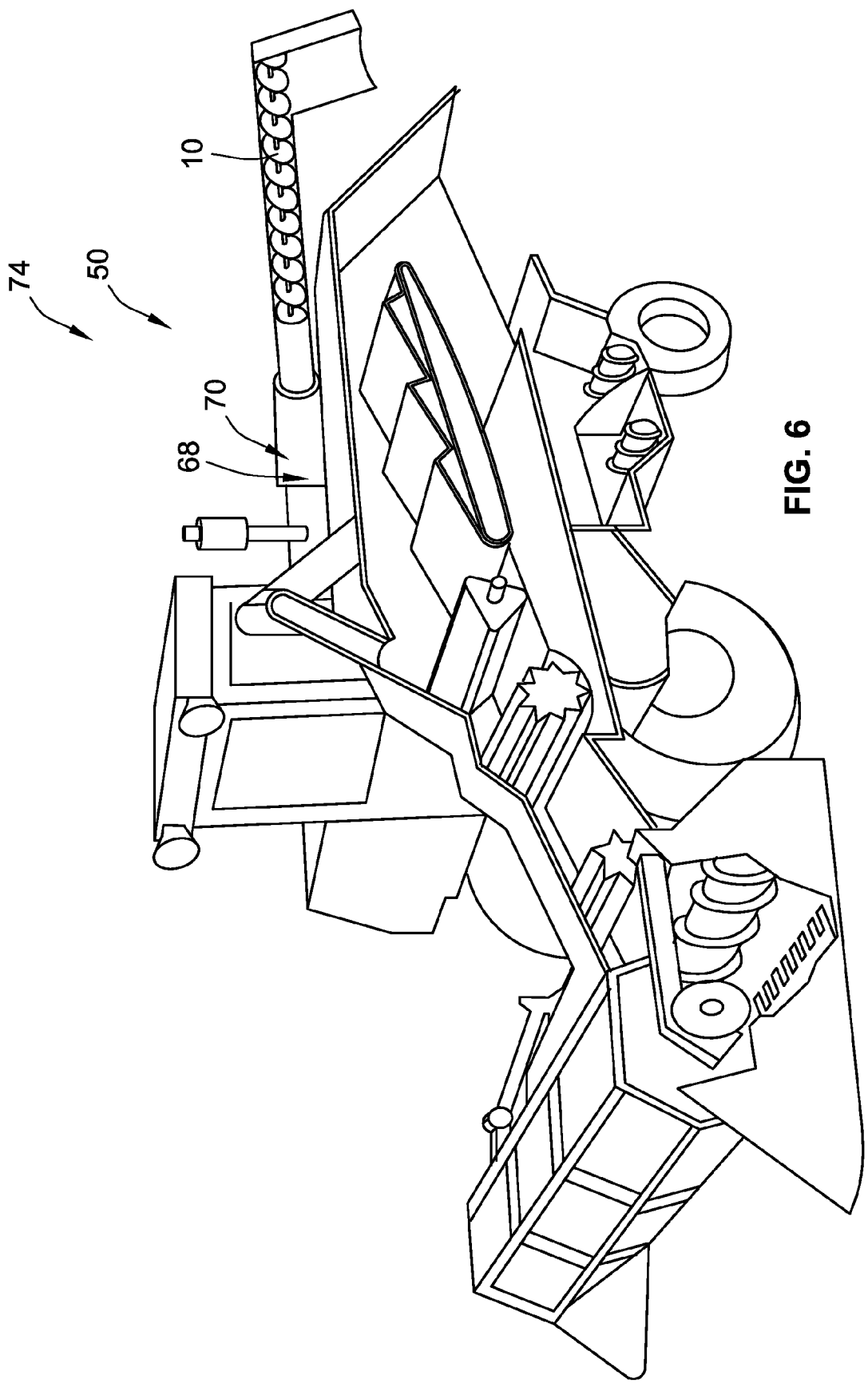
FIG. 6 is a schematic of a combine harvester employing an embodiment of the present invention.
Figure 7:
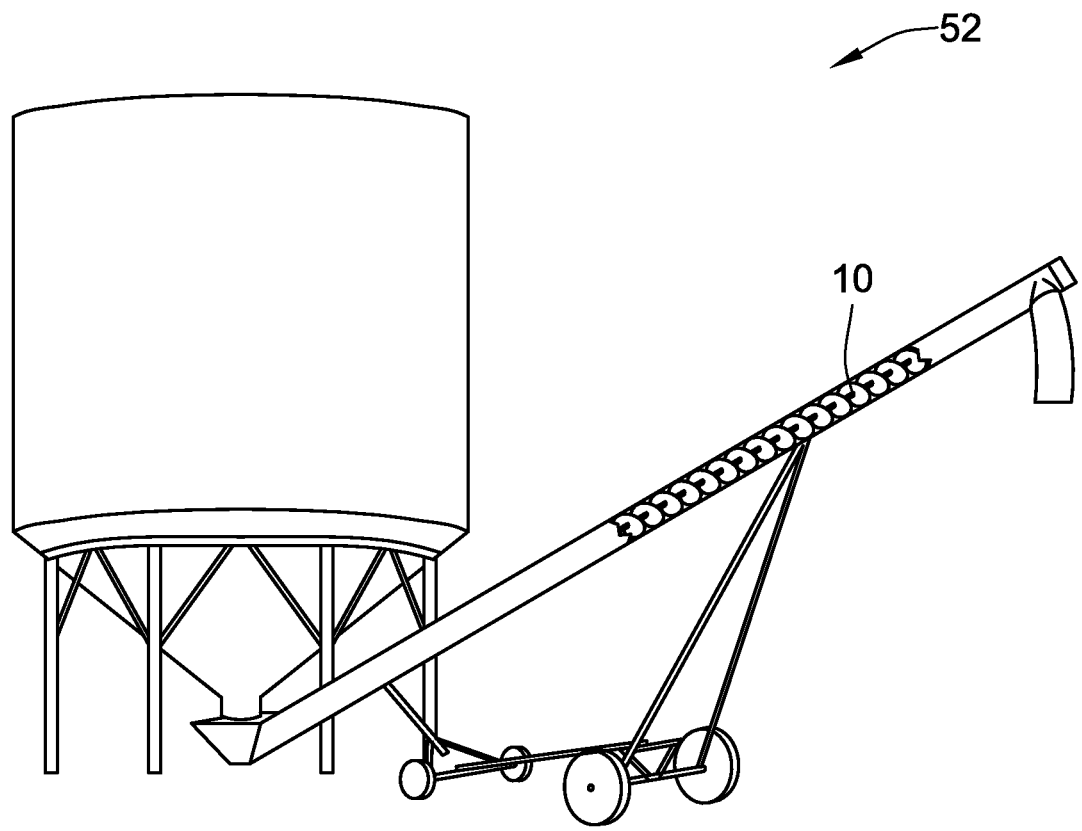
FIG. 7 is a schematic of tube auger employing an embodiment of the present invention.
Figure 8:
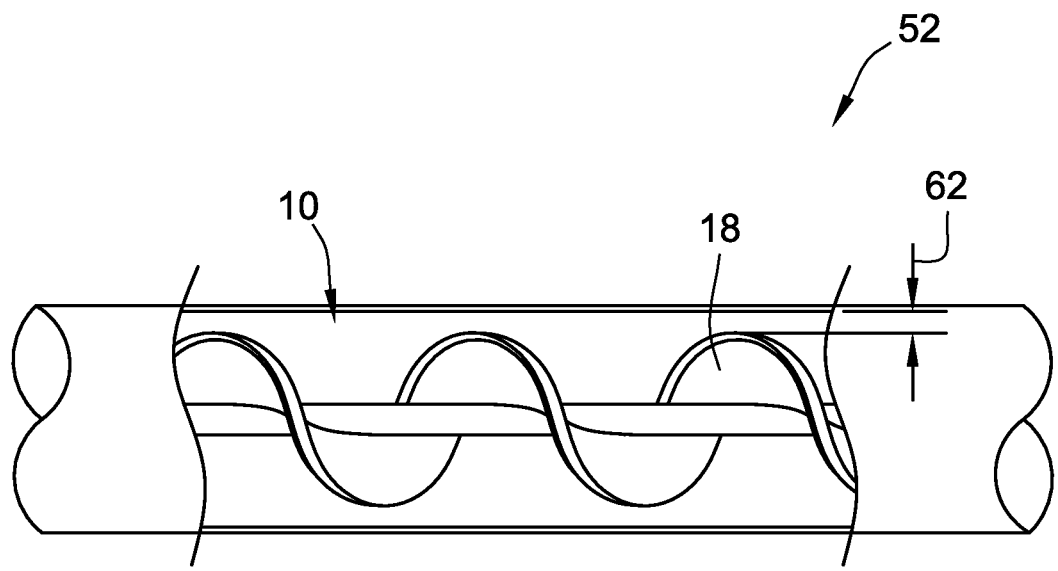
FIG. 8 is a schematic of a cross section of the tube auger of FIG. 7 of the present invention with clearance between auger and tube being exaggerated for illustrative purposes.

FIG. 6 illustrates an agricultural grain handling device comprising an agricultural housing 70 comprising a combine harvester 50 employing a section of the agricultural auger 10 which includes a bin 68 which further includes an agricultural auger according to an embodiment of the present invention. FIG. 7 illustrates an agricultural grain handling device comprising an agricultural housing comprising a tube auger 52 with an embodiment of the present invention. FIG. 8 shows a cross section schematic of the agricultural auger 10 within the tube auger 52 of FIG. 7. A clearance 62 between the tube 52 and the outer circumferential edge 46 of the flight 18 with cladding 24 is shown. The clearance 62 may be between 0 mm and 20 mm, but typically greater than 1 mm.

The use of laser hardening and laser cladding provides for a very precise heat treatment pattern, a small transition zone between the hardened area and the unhardened areas, minimal distortion in the fighting and the ability to heat treat the auger 10 as assembled. Further, one or the other of the of the laser heat treatment methods may be employed as desired, that is laser cladding might be employed on one section of auger or to the entire auger while yet another auger may have only laser cladding applied and no laser hardening while still another auger might have both laser cladding and laser hardening applied.

Where laser cladding is applied control of the laser cladding tool can be made to vary the profile of the laser cladding material in both depth and width, that is laser cladding may be applied so as to increase the radial span 58 of the flight 18 and/or the laser cladding may be applied in various widths to span the entire outer circumferential edge 46 of the flight 18, or over only a portion of the circumferential edge 46 or even over the circumferential edge 46 onto the upstream face of the flight 38. Application then of the laser cladding tool may include increasing processing speeds to make thinner sections and decreasing processing speeds to make thicker sections. For example, the laser cladding tool can be run faster or slower, which correspondently deposits more or less material. Alternatively, laser power can be varied through a pass to change the deposition rates. Alternatively, or in addition, the powder flow rate through a laser tool pass can be made to radially decrease or increase the depth of cladding over the outer circumferential edge 46. t.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fabricated agricultural auger for conveying grain material, comprising:
   a shaft adapted to rotate about a central axis;
   a flight extending and spiraling about the shaft, the flight comprising a base material of a first hardness;
   wherein the flight is separately fabricated from the shaft and welded or otherwise secured thereto; and
   a laser treated material formed on or into the base material along a portion of the flight, the laser treated material comprising a second hardness greater than the first hardness;
   wherein the base material is steel, and the laser treated material comprises a laser hardened layer formed integrally with an outer surface of the base material; and
   wherein auger has a predetermined inlet end and a predetermined outlet end, the flight includes an upstream face facing toward the outlet end and a downstream face facing toward the inlet end, wherein rotation of the auger conveys material from the inlet end to the outlet end, wherein the laser hardened layer is along the upstream face only, the downstream face only having an outer untreated surface of the base material.

2. A fabricated agricultural auger for conveying grain material, comprising:
   a shaft adapted to rotate about a central axis;
   a flight extending and spiraling about the shaft, the flight comprising a base material of a first hardness;
   wherein the flight is separately fabricated from the shaft and welded or otherwise secured thereto; and
   a laser treated material formed on or into the base material along a portion of the flight, the laser treated material comprising a second hardness greater than the first hardness;
   wherein the base material is steel, and the laser treated material comprises a laser hardened layer formed integrally with an outer surface of the base material; and
   wherein the fabricated agricultural auger further comprises an outer treated region of the laser hardened layer along an outer radial periphery of the flight, and an inner untreated region of an outer untreated surface of the base material disposed radially between the outer treated region and the shaft.

3. The fabricated agricultural auger of claim 2, wherein the laser hardened layer is at least 0.5 millimeter in depth thickness along the base material.

4. The fabricated agricultural auger of claim 3, wherein the laser hardened layer is between 0.5 and 5 millimeters in depth thickness along the base material.

5. The fabricated agricultural auger of claim 2, wherein the outer treated region comprises between 30% and 35% of a radial span of the flight.

6. The fabricated agricultural auger of claim 2, wherein the base material has a hardness less than 25 in Rockwell C Scale hardness, and wherein the a laser treated material has a hardness between 30 and 62 in Rockwell C Scale hardness.

7. The fabricated agricultural auger of claim 2, wherein the laser treated material comprises laser cladding including a clad material different than the base material.

8. The fabricated agricultural auger of claim 7, wherein the clad material is laid along an outermost circumference of the flight and forms a radial outermost peripheral contact surface.

9. The fabricated agricultural auger of claim 8, wherein the auger has a predetermined inlet end and a predetermined outlet end, the flight includes an upstream face facing toward the outlet end and a downstream face facing toward the inlet end, wherein rotation of the auger conveys material from the inlet end to the outlet end, and an outer circumference edge of base material extending between the upstream face and the downstream face, wherein the laser clad is formed along the outer circumference edge, and wherein the flight faces are free of laser clad.

10. The fabricated agricultural auger of claim 8, wherein the clad material comprises at least one of the materials comprising: tungsten carbide, chrome carbide, iron carbide, ceramic, and other material having a Vickers scale hardness between HV 1200-3200.

11. The fabricated agricultural auger of claim 10, wherein the clad material is in joined with the laser hardened layer at an outer radial edge thereof.

12. An apparatus including the auger of claim 2, the apparatus comprising an agricultural grain handling device with the auger therein.

13. The apparatus of claim 12, wherein the agricultural grain handling device is a transport auger.

14. The apparatus of claim 12, wherein the agricultural grain handling device is a combine harvester.

15. The apparatus of claim 12, wherein the agricultural grain handling device is a grain bin.

16. The apparatus of claim 12, wherein the agricultural grain handling device is a tube auger.

17. A fabricated a agricultural auger for conveying grain material, comprising:
   a shaft adapted to rotate about a central axis;
   a flight extending and spiraling about the shaft, the flight comprising a base material of a first hardness;
   wherein the flight is separately fabricated from the shaft and welded or otherwise secured thereto; and
   a laser treated material formed on or into the base material along a portion of the flight, the laser treated material comprising a second hardness greater than the first hardness;
   wherein the laser treated material comprises laser cladding including a clad material different than the base material, and wherein the base material is steel, and the laser treated material additionally comprises a laser hardened layer formed integrally with an outer surface of the base material.

18. A method of hardening a fabricated agricultural auger comprising a shaft adapted to rotate about a central axis, and a flight adapted to extend around and spiral about the shaft, the flight comprising a base material of a first hardness, wherein the flight is separately fabricated from the shaft and welded or otherwise secured thereto; the method comprising:
   laser treating a portion of the base material to provide hardened region to the auger with a second hardness greater than the first hardness; and
   wherein said laser treating comprises laser cladding a clad material to a region proximate an outermost circumferential surface of the flight.

19. The method of claim 18, wherein said laser treating comprises laser hardening an outer surface of the base material to provide a laser hardened layer formed integrally with the base material.

20. The method of claim 18, wherein the laser treating is conducted after the flight is secured to the shaft.

21. A method of hardening a fabricated agricultural auger comprising a shaft adapted to rotate about a central axis, and a flight adapted to extend around and spiral about the shaft, the flight comprising a base material of a first hardness, wherein the flight is separately fabricated from the shaft and welded or otherwise secured thereto; the method comprising:
- laser treating a portion of the base material to provide a hardened region to the auger with a second hardness greater than the first hardness; and
- wherein said laser treating comprises laser cladding a clad material to a region proximate an outermost circumferential surface of the flight, and comprises laser hardening an outer surface of the base material to provide a laser hardened layer formed integrally with the base material.

22. A fabricated agricultural auger for conveying grain material, comprising:
- a shaft adapted to rotate about a central axis;
- a flight extending and spiraling about the shaft, the flight comprising a base material of a first hardness;
- wherein the flight is separately fabricated from the shaft and welded or otherwise secured thereto; and
- a laser treated material formed on or into the base material along a portion of the flight, the laser treated material comprising a second hardness greater than the first hardness;
- wherein the laser treated material comprises laser cladding including a clad material different than the base material;
- wherein the clad material is laid along an outermost circumference of the flight and forms a radial outermost peripheral contact surface; and
- wherein the auger has a predetermined inlet end and a predetermined outlet end, the flight includes an upstream face facing toward the outlet end and a downstream face facing toward the inlet end, wherein rotation of the auger conveys material from the inlet end to the outlet end, and an outer circumference edge of base material extending between the upstream face and the downstream face, wherein the laser clad is formed along the outer circumference edge.

23. The fabricated agricultural auger of claim 22, wherein clad is formed along only a portion of the circumference edge of base material.

24. An agricultural grain handling device, comprising:
an agricultural housing comprising:
- at least one of a grain bin, an auger tube, an auger trough; and
- an auger disposed in the housing; wherein the auger comprises:
- a shaft adapted to rotate about a central axis;
- a flight extending and spiraling about the shaft, the flight comprising a base material of a first hardness;
- a laser treated material formed on or into the base material along a portion of the flight, the laser treated material comprising a second hardness greater than the first hardness; and
- wherein the auger has a predetermined inlet end and a predetermined outlet end, the flight includes an upstream face facing toward the outlet end and a downstream face facing toward the inlet end, wherein rotation of the auger conveys material from the inlet end to the outlet end, wherein the laser hardened layer is along the upstream face only, the downstream face only having an outer untreated surface of the base material.

25. The auger of claim 24, wherein the base material is steel, and the laser treated material comprises a laser hardened layer formed integrally with an outer surface of the base material.

26. An agricultural grain handling device, comprising:
an agricultural housing comprising:
- at least one of a grain bin, an auger tube, an auger trough; and
- an auger disposed in the housing; wherein the auger comprises:
- a shaft adapted to rotate about a central axis;
- a flight extending and spiraling about the shaft, the flight comprising a base material of a first hardness;
- a laser treated material formed on or into the base material along a portion of the flight, the laser treated material comprising a second hardness greater than the first hardness; and
- wherein the agricultural auger further comprises an outer treated region of the laser hardened layer along an outer radial periphery of the flight, and an inner untreated region of an outer untreated surface of the base material disposed radially between the outer treated region and the shaft.

27. The agricultural auger of claim 26, wherein the clad material is laid along an outermost circumference of the flight and forms a radial outermost peripheral contact surface.

28. An agricultural grain handling device, comprising:
an agricultural housing comprising:
- at least one of a grain bin, an auger tube, an auger trough; and
- an auger disposed in the housing; wherein the auger comprises:
- a shaft adapted to rotate about a central axis;
- a flight extending and spiraling about the shaft, the flight comprising a base material of a first hardness;
- a laser treated material formed on or into the base material along a portion of the flight, the laser treated material comprising a second hardness greater than the first hardness; and
- wherein the laser treated material comprises laser cladding including a clad material different than the base material.

29. The agricultural auger of claim 28, wherein the auger has a predetermined inlet end and a predetermined outlet end, the flight includes an upstream face facing toward the outlet end and a downstream face facing toward the inlet end, wherein rotation of the auger conveys material from the inlet end to the outlet end, and an outer circumference edge of base material extending between the upstream face and the downstream face, wherein the laser clad is formed along the outer circumference edge.

30. The agricultural auger of claim 28, wherein the auger has a predetermined inlet end and a predetermined outlet end, the flight includes an upstream face facing toward the outlet end and a downstream face facing toward the inlet end, wherein rotation of the auger conveys material from the inlet end to the outlet end, and an outer circumference edge of base material extending between the upstream face and the downstream face, wherein the laser clad is formed along the outer circumference edge, and wherein the flight faces are free of laser clad.

31. The agricultural auger of claim 28, wherein the clad material comprises at least one of the materials comprising: tungsten carbide, chrome carbide, iron carbide, ceramic, and other material having a Vickers scale hardness between HV 1200-2500.

32. The agricultural auger of claim 31, wherein the clad material is in joined with the laser hardened layer at an outer radial edge thereof.

33. An agricultural grain handling device, comprising:
an agricultural housing comprising:
at least one of a grain bin, an auger tube, an auger trough; and
an auger disposed in the housing; wherein the auger comprises:
a shaft adapted to rotate about a central axis;
a flight extending and spiraling about the shaft, the flight comprising a base material of a first hardness;
a laser treated material formed on or into the base material along a portion of the flight, the laser treated material comprising a second hardness greater than the first hardness; and
wherein the laser treated material comprises laser cladding including a clad material different than the base material, and wherein the base material is steel, and the laser treated material additionally comprises a laser hardened layer formed integrally with an outer surface of the base material.

34. A fabricated agricultural auger for conveying grain material, comprising:
a shaft adapted to rotate about a central axis;
a flight extending and spiraling about the shaft, the flight comprising a base material of a first hardness;
wherein the flight is separately fabricated from the shaft and welded or otherwise secured thereto;
a clad material formed on or into the base material along a portion of the flight, the cladding comprising a second hardness greater than the first hardness, the clad material being different than the base material;
wherein the base material is steel, and the clad material is formed on or into an outer surface of the base material; and
an outer treated region of the clad material along an outer radial periphery of the flight, and an inner untreated region of an outer untreated surface of the base material disposed radially between the outer treated region and the shaft.

35. The fabricated agricultural auger of claim 25, wherein the clad material comprises a laser cladding.

36. The fabricated agricultural auger of claim 35, wherein the clad material is laid along an outermost circumference of the flight and forms a radial outermost peripheral contact surface, the outer treated region including the outermost circumference.

37. The fabricated agricultural auger of claim 36, wherein the auger has a predetermined inlet end and a predetermined outlet end, the flight includes an upstream face facing toward the outlet end and a downstream face facing toward the inlet end, wherein rotation of the auger conveys material from the inlet end to the outlet end, and an outer circumference edge of base material extending between the upstream face and the downstream face, wherein the laser clad is formed along the outer circumference edge.

38. The fabricated agricultural auger of claim 37, wherein clad material is formed along only the circumference edge of base material.

39. The fabricated agricultural auger of claim 36, wherein the auger has a predetermined inlet end and a predetermined outlet end, the flight includes an upstream face facing toward the outlet end and a downstream face facing toward the inlet end, wherein rotation of the auger conveys material from the inlet end to the outlet end, and an outer circumference edge of base material extending between the upstream face and the downstream face, wherein the laser clad is formed along the outer circumference edge, and wherein the flight faces are free of laser clad.

40. The fabricated agricultural auger of claim 34, wherein the clad material comprises at least one of the materials comprising: tungsten carbide, chrome carbide, iron carbide, ceramic, and other material having a Vickers scale hardness between HV 1200-3200.

* * * * *